Patented May 3, 1932

1,856,264

UNITED STATES PATENT OFFICE

MALCOLM N. RICH, OF EAST ORANGE, NEW JERSEY, ASSIGNOR TO WESTINGHOUSE LAMP COMPANY, A CORPORATION OF PENNSYLVANIA

METHOD OF SEPARATING ZIRCONIUM, TITANIUM, AND HAFNIUM

No Drawing.    Application filed November 28, 1927. Serial No. 236,382.

This invention relates to the metallurgy of rare refractory metals and more particularly to a process of producing chemically pure compounds of titanium, zirconium and hafnium from their ores.

So far as I am aware, no suitable process has been devised for effecting the separation of titanium, zirconium and hafnium from their ores. The process herein described may be effectively employed to accomplish this purpose, thus enabling one to produce substantially chemically pure compounds of the three metals mentioned from which the metals themselves may be readily obtained by well known chemical reactions.

Briefly stated, my invention is based upon the separation of the three elements mentioned as the double alkali sulphates from solutions of the normal sulphate and more specifically upon the separation of the double potassium sulphate. I accomplish this result by taking advantage of the differences in solubility of the double potassium sulphates of these three elements, in excess of the precipitant, water, dilute and concentrated acids. By such a procedure, titanium may be removed from zirconium and the latter from hafnium, and thereby obtain substantially chemically pure compounds of each of the elements named.

Referring more specifically to these differences in solubility, potassium-zirconium sulphate is precipitated from solutions of the normal zirconium sulphate by the addition of potassium sulphate to excess according to the following equations which have been variously given:

$$4Zr(SO_4)_2 + K_2SO_4 \text{ aqua} = 4ZrO(SO_4).(OH)_8K_2 + 5H_2SO_4$$

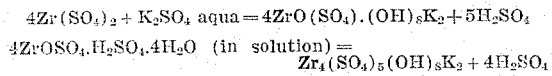
$$Zr_4(SO_4)_5(OH)_8K_2 + 4H_2SO_4$$

The double sulphate formed is difficultly soluble in dilute sulphuric acid and insoluble in excess of potassium sulphate. The precipitation of this compound takes place best from a concentrated solution, if the dilution be too great the acidity is not sufficient to prevent hydrolysis and the precipitation of double basic compounds of greater hydroxide content which are difficult to handle and filter. The precipitate obtained through the addition of $K_2SO_4$ (to excess) to a concentrated normal sulphate solution is semi-crystalline and easily filtered and washed. From the formula as written above, it will be seen that the precipitation of this compound causes the liberation of 5 moles of sulphuric acid for every 4 moles of normal zirconium sulphate present. This raises the acidity of the solution appreciably and the dilution of the solution must be great enough to maintain an acidity low enough to permit precipitation of substantially all of the zirconium, and yet retain enough acidity to hold up the titanium, iron and other impurities in solution.

Titanium double sulphate (if formed) seems to be soluble in practically any degree of acidity and does not appear to be precipitated from concentrated normal sulphate solutions. In acid solutions of high degree of dilution titanium may be precipitated, especially when warmed, by more of a hydrolysis than by a double sulphate precipitation.

Zirconium, being more basic than titanium, hafnium and thorium, all form double potassium sulphates, insoluble in excess of the precipitant. Other alkali double sulphates are formed, which have different solubilities and physical composition, and may be employed, but the best precipitate to handle is the potassium compound.

Hafnium double sulphate being more basic than the zirconium compound may be separated from the zirconium in two ways, (1) fractional solution or (2) fractional precipitation. This compound is apparently difficultly soluble except in very strong sulphuric acid, and may be separated by saturating concentrated sulphuric acid with the mixed zirconium and hafnium double alkali sulphate. The undissolved residue is then filtered off, washed with water and rendered soluble by digestion in hot concentrated sulphuric acid. Residual zirconium may be removed by fractionally precipitating this acid solution by carefully neutralizing with KOH or $K_2CO_3$ until a permanent precipitation is just obtained. The solution should be allowed to stand for a few hours or over night and the mother liquor containing the residual Zr then filtered off. There appears to be a wide range of acidity which will effect a separation of the three elements (Ti, Zr, Hf) in acid solution. Titanium is easily soluble in excess acid; zirconium more difficultly soluble but may be precipitated from quite strong acidity and hafnium appears to be quite insoluble except in the most strongly acid solutions, and once precipitated and dried resists solution except in very concentrated acid.

Following the precipitation of the hafnium from solution a considerable further removal of acid must be effected before precipitation of the zirconium is effected. In fact, the precipitation of the zirconium appears to be dependent more upon the concentration of the potassium sulphate in the solution than upon the acidity or dilution (up to certain limits that permit hydrolysis to hydrated compounds).

The precipitated double sulphates may be readily converted to hydroxides by digestion in alkali hydroxide solution (hot or cold) and after washing by decantation may be ignited to oxides.

The following is a specific example of a method which may be practiced to obtain the desired results. This method logically divides itself into four stages which briefly stated are (1) preparation of the raw material; (2) removal of titanium; (3) removal of hafnium and purification of zirconium; and (4) recovery of hafnium and separation of zirconium.

Preparation of raw material

The raw material employed in the following methods of recovery of the three elements is preferably the precipitated hydroxides from the sulphurous oxide precipitation of the chloride which eliminates all of the rare earths and cerium which would otherwise interfere with the subsequent procedure of double sulphate separation.

The raw starting material may be prepared as follows: Zirconium ore containing silicates is fused with caustic soda and sodium peroxide. The fusion is leached with a large volume of water to effect the solution of sodium silicates, aluminates, etc. The residue consisting of zirconates, hafnates and titanates, together with iron oxides and residual silica, is rendered soluble with hydrochloric acid by digestion and should be carried to dryness to dehydrate the silica. The water solution of the chlorides is then filtered and nearly neutralized with sodium carbonate after which sulphur dioxide is passed therethrough. The precipitate obtained consisting of the hydrated oxides of titanium, zirconium and hafnium is the raw material employed in the following stages of my process and consists of the hydroxides.

Removal of titanium

The precipitated hydroxides from the $SO_2$ precipitate are digested in $H_2SO_4$ and carried to dryness at 400° C. This is to obtain the normal sulphate ($Zr(SO_4)_2 4H_2O$).

The normal sulphate is then dissolved in water. The solubility of the normal sulphate is approximately 146 grams per 100 c. c. at 39.5° C. The mole weights of $Zr(SO_4)_2.4H_2O$ is 354.8 grams and of $Zr(SO_4)_2$ is 282.7 grams which liberate on precipitation 97 grams of free sulphuric acid, according to the reactions given heretofore, which would give an acidity from a saturated solution of the normal sulphate of practically 100 gms. per 250 c. c. solution, approximately 40% acidity. To keep the acidity to 10% sulphuric the dilution should be one mole weight per liter. To allow for insolubles (silica, etc.) and for acidity due to the hydrolysis of titanium, iron, and residual sulphuric acid it is estimated that not more than 300 grams per liter of the sulphated oxides should be taken. To precipitate one mole weight $Zr(SO_4)_2$ according to the reactions previously given would require one mole weight of $K_2SO_4$ or 175 gms. The solubility of $K_2SO_4$ is 8.5 gms. per 100 c. c. at 0° C. and 26.2 gms. at 100° C. For the purpose of conserving the amount of potassium sulphate used, and more easily obtaining a highly saturated solution of $K_2SO_4$ to effect maximum precipitation, the temperatures of the solution and the extent of dilution should be kept low.

Theoretically, to effect the complete precipitation of one mole weight 354.8 gms. of normal zirconium sulphate, would require 175 gms. $K_2SO_4$ which would require 2 liters of water to effect complete solution. Practically as all of the $K_2SO_4$ is removed from solution that much volume is not required but sufficient excess $K_2SO_4$ should be added to practically saturate the bulk of solution at 20° C. Theoretically, this should be in the neighborhood of 15 gms. excess per 100 c. c. solution or 150 gms. per liter which would be a large excess over that required to effect precipitation, and is what I commonly use. As the $K_2SO_4$ used is all recovered subsequently to be used again the amount of excess employed is immaterial from a cost standpoint.

The acid solution is treated with solid $K_2SO_4$ crystals to excess and stirred to effect solution. This operation should be done in the cold, as the precipitate so thrown down is easily filtered and handled. The precipitated zirconium and hafnium double alkali sulphates is allowed to settle and then may be filtered on suction, and washed with distilled water containing potassium sulphate slightly acidified to remove occluded titanium and iron. If a sufficient excess of $K_2SO_4$ has not been used some loss of zirconium may be effected at this time, but can be recovered from solution easily by precipitation with $K_2SO_4$. The filtrate containing the titanium salts can then be treated by any of the well known methods for the recovery of the titanium. The dried cake of mixed zirconium and hafnium double alkali sulphates is employed in the process following for the separation of hafnium from zirconium.

Removal of hafnium and purification of zirconium

The suction dried cake of combined zirconium and hafnium double sulphates obtained in the foregoing process is fed slowly into concentrated sulphuric acid until no further solution is effected. The object here is to effect a preferential solution of zirconium double sulphate and leave the hafnium behind as a precipitate. In order to effect this an excess of the zirconium compound must be present, and the precipitate will consist essentially of a hafnium rich zirconium double sulphate. The process of solution is assisted materially by gently warming. If carried to fumes, the hafnium compound will be brought into solution which is not desired at this time.

The reaction herein involved is essentially a conversion of the double alkali sulphate back to the normal zirconium sulphate according to the following reaction:

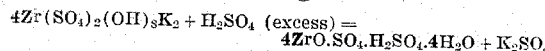
$4Zr(SO_4)_2(OH)_3K_2 + H_2SO_4$ (excess) = $4ZrO.SO_4.H_2SO_4.4H_2O + K_2SO_4$ The acid solution is then filtered and the precipitate washed with water containing sulphuric acid. The filtrate contains the bulk of the zirconium substantially free of hafnium but containing traces of titanium and iron, while the precipitate contains the bulk of the hafnium with traces of zirconium.

The zirconium in this filtrate is recovered substantially free of titanium and iron by neutralizing the bulk of the excess acid with potassium carbonate or potassium hydroxide to precipitate out the double potassium sulphate of zirconium. Unless diluted the precipitation is almost solid. Extreme dilution does not promote immediate precipitation but it may be precipitated after standing for a period of time as basic compounds. The insolubility of the zirconium double sulphate compounds is most effected by the concentration and amount of excess potassium sulphate.

The filtrate may be warmed (but not boiled) and the neutralization continued until precipitation occurs. In case the filtrate is too dilute there will be formed a carbonate or a basic precipitate when the solution has become nearly neutral. In such case, the concentration of the potassium sulphate is not sufficient to effect precipitation as the double sulphate. Additions of potassium acid sulphate to such a solution, except in solutions of extreme dilution, will effect decomposition of the carbonate or basic compounds formed and their resolution. Further addition of solid potassium sulphate will bring down the double sulphate as desired. For the purpose of cutting down the amount of precipitant used, concentrated solutions should be employed. A dilution of not more than one part by volume of the acid solutions of the mixed sulphates to five parts water has been found to yield the best results, in type of precipitate and bulk of filtrate to filter off.

Recovery of hafnium and separation of zirconium

The precipitate containing the hafnium with traces of zirconium and resulting from the zirconium separation process is dissolved in hot concentrated sulphuric acid and carried to fumes to completely remove the silica. The solution is then diluted with water to about three times its volume. To the stronger acid filtrate solid potassium sulphate is added to ensure an excess and the solution carefully neutralized to precipitation with potassium carbonate. (Solution may be warmed but not boiled). Care should be taken that all of the $CO_2$ is evolved before further addition of potassium carbonate. Precipitation of the hafnium from this solution may be readily made and from a much stronger acidity than from the zirconium solution. After standing for several hours to settle, the hafnium precipitate may be filtered and washed with water containing potassium sulphate and converted to the hydroxides by suspension in alkaline solution and boiling from which the hafnium may be recovered by well known processes.

This filtrate will be found to contain appreciable zirconium which may be recovered by further neutralizing the solution with potassium carbonate to precipitation or the solution may be used in diluting the original acid digestion of the mixed hafnium and zirconium double sulphates.

One of the advantages of this method over other commercial processes is that the filtrates from these processes, by making alkaline with potassium carbonate or potassium hydroxide and filtering from the residual titanium, zirconium and hafnium, may be acidified with sulfuric acid concentrated by evaporating and the potassium sulphate thus recovered and put back into the process again.

From the foregoing it is apparent that I have devised a relatively simple procedure for effecting a separation of the rare refractory metals titanium, hafnium and zirconium in the form of double sulphates. These sulphates may be readily treated by well known methods to obtain other compounds for reduction to the pure metal.

Modifications of the process as outlined in detail may occur to those skilled in the art, but such changes are contemplated as come within the spirit and scope of my invention as defined by the appended claims.

What is claimed is:

1. The method of separating titanium from hafnium and zirconium which comprises forming acid sulfate compounds thereof and drying said compounds at about 400° C. to obtain a normal sulphate, dissolving the sulphate in water, adding to this dilute acid solution, solid potassium sulphate crystals, filtering the precipitate and treating the filtrate to remove the titanium.

2. The method of separating zirconium from titanium and hafnium which comprises forming substantially pure sulphate compounds of said elements, drying said compounds at about 400° C. to form the normal sulphate, dissolving the sulphate in water and adding to this dilute acid solution solid alkali sulphate crystals, filtering the precipitate which latter contains combined zirconium and hafnium double sulphates, feeding said precipitate slowly into concentrated sulphuric acid until no further solution is effected, filtering and treating the residue with hot concentrated sulphuric acid carried to fumes, diluting the solution with water and adding thereto solid alkali sulphate and neutralizing with alkali carbonate to precipitation, filtering and treating the filtrate to remove the zirconium.

3. The method of separating titanium, zirconium and hafnium which comprises forming substantially pure admixed double alkali metal sulfate compounds of these elements, and separating these compounds according to their relative solubilities in sulfuric acid solutions.

4. The process of separating titanium, zirconium and hafnium which comprises forming a normal sulfate compound of these elements, effecting an aqueous solution of the sulfate compounds, separating from the solution the double alkali compounds of zirconium and hafnium, and thereafter fractionally separating the zirconium and hafnium compounds by the action of warm concentrated sulfuric acid thereon.

5. The process of separating the elements titanium, zirconium and hafnium which comprises forming an acid free sulfate compound of these elements, dissolving said sulfate compound in water, adding thereto an alkali metal sulfate compound, recovering the precipitated double alkali zirconium and hafnium compounds, and then effecting a separation of the zirconium and hafnium compounds by solution of the former in warm concentrated sulfuric acid.

6. The process of separating titanium, zirconium and hafnium which comprises forming an aqueous solution of the normal sulfate compound thereof, adjusting the dilution thereof to give an acidity of approximately 10 percent, effecting a precipitation of the zirconium and hafnium content as double alkali metal compounds recovering said precipitate, and effecting a separation of the zirconium from the hafnium by solution in warm concentrated sulfuric acid.

7. The process of separating titanium, zirconium and hafnium which comprisis effecting a precipitation of the double alkali metal sulfate compounds thereof in dilute acid solution, removing the precipitated zirconium and hafnium, effecting a fractional separation of the zirconium and hafnium compounds by solution of the former from the latter in warm concentrated sulfuric acid, recovering the hafnium remaining and purifying the hafnium compound by solution in hot concentrated sulfuric acid and reprecipitation from strongly acid aqueous solution as the double alkali metal sulfate compound.

8. The method of separating hafnium from titanium and zirconium which comprises effecting a precipitation of the double potassium sulfate compounds thereof from a dilute acid aqueous solution of the sulfates thereof, recovering the zirconium and hafnium precipitate, fractionally dissolving the zirconium from the hafnium in warm concentrated sulfuric acid, recovering the undissolved hafnium and effecting a purification thereof by dissolving the same in hot concentrated sulfuric acid, and reprecipitating the double potassium hafnium sulfate compound from a strongly acid solution.

9. The method of separating titanium from zirconium and hafnium which comprises forming a weakly acid aqueous solution of the sulfate compounds of these elements and precipitating the zirconium and hafnium content thereof by the addition thereto of an alkali metal sulfate.

10. The method of separating titanium from zirconium and hafnium which comprises forming not more than a 10 percent acid aqueous solution of the sulfates of these elements, and precipitating the zirconium and hafnium content thereof by the addition thereto of an alkali metal sulfate.

11. The method of separating titanium from zirconium and hafnium which comprises forming not more than a 10 percent acid aqueous solution of the sulfates of these elements and adding thereto potassium sulfate.

12. The method of separating titanium from zirconium and hafnium which comprises forming a slightly acid aqueous solution containing the sulfate compounds of these elements, adding thereto potassium sulfate in excess, and thereafter separating the precipitate from the filtrate.

13. The method of separating zirconium and hafnium from titanium which comprises forming an aqueous solution of the sulfate compounds of these elements, diluting to give not more than 10 percent acidity, cooling said solution to approximately room temperatures adding thereto solid potassium sulfate in large excess, and then separating the filtrate from the precipitate.

14. The method of separating zirconium from hafnium which comprises forming the double alkali metal sulfate compounds thereof and selectively dissolving the zirconium compound from the hafnium compound by the action of warm concentrated sulfuric acid.

15. The method of separating zirconium from hafnium which comprises forming the double potassium sulfate compounds thereof and effecting selective solution of the zirconium compound from the hafnium compound by the action of warm concentrated sulfuric acid.

16. The method of preparing hafnium free from titanium and zirconium which comprises forming the normal acid free substantially pure sulfates of these elements, dissolving these sulfate compounds in water to give not more than 10 percent acidity therein, adding to the cold solution an alkali sulfate in large excess, recovering the precipitated zirconium and hafnium double alkali sulfates, suspending the precipitate in warm concentrated sulfuric acid and separating the undissolved hafnium compound remaining.

17. The method of preparing hafnium free from titanium and zirconium which comprises forming the normal acid free substantially pure sulfate compound of these elements, forming not more than a 10 percent acid solution thereof, cooling said solution, adding thereto potassium sulfate to large excess, recovering the precipitate substantially free from the filtrate, suspending the recovered precipitate in warm concentrated sulfuric acid, again recovering the precipitate substantially free from the filtrate, effecting solution thereof in hot concentrated sulfuric acid, forming a strongly acid aqueous solution thereof and effecting a precipitation of the hafnium content thereof by the addition thereto of potassium sulfate to excess.

18. The method of separating hafnium from titanium and zirconium which comprises forming a substantially pure sulphate compound thereof and drying said compound at about 400° C., to form the normal sulphate, dissolving the sulphate in water and adding to this dilute acid solution solid alkali sulphate crystals, filtering the precipitate which latter contains combined zirconium and hafnium double sulphates, feeding said precipitate slowly into concentrated sulphuric acid until no further solution is effected, filtering and treating the precipitate to remove the hafnium.

In testimony whereof I have hereunto subscribed my name this 25th day of November, 1927.

MALCOLM N. RICH.